(12) United States Patent
Alneyadi

(10) Patent No.: US 12,502,652 B2
(45) Date of Patent: Dec. 23, 2025

(54) SYNTHESIS OF PHOSPHAZENE-COVALENT ORGANIC FRAMEWORK (COF) FOR ENHANCED LEAD CAPTURE WITH VISUAL FEEDBACK

(71) Applicant: United Arab Emirates University, Al Ain (AE)

(72) Inventor: Shaikha Alneyadi, Al Ain (AE)

(73) Assignee: UNITED ARAB EMIRATES UNIVERSITY, Al-Ain (AE)

( * ) Notice: Subject to any disclaimer, the term of this patent is extended or adjusted under 35 U.S.C. 154(b) by 0 days.

(21) Appl. No.: 19/249,200

(22) Filed: Jun. 25, 2025

(65) Prior Publication Data

US 2025/0352980 A1    Nov. 20, 2025

Related U.S. Application Data

(62) Division of application No. 18/665,132, filed on May 15, 2024, now Pat. No. 12,370,524.

(51) Int. Cl.
*B01J 20/22*    (2006.01)
*B01J 20/28*    (2006.01)
(Continued)

(52) U.S. Cl.
CPC ......... *B01J 20/22* (2013.01); *B01J 20/28066* (2013.01); *B01J 20/28076* (2013.01); *B01J 20/3085* (2013.01); *C02F 1/285* (2013.01); *C07F 9/6521* (2013.01); *C02F 2101/20* (2013.01)

(58) Field of Classification Search
None
See application file for complete search history.

(56) References Cited

PUBLICATIONS

Chang et al., "Quasi-Three-Dimensional Cyclotriphosphazene-Based Covalent Organic Framework Nanosheet for Efficient Oxygen Reduction." Nano-Micro Lett. (2023) 15:159. Published online on Jun. 29, 2023; includes Supplementary Info. sheets (54 pages).

*Primary Examiner* — Daniel Berns
(74) *Attorney, Agent, or Firm* — MH2 Technology Law Group, LLP

(57) ABSTRACT

There is disclosed a nitrogen-phosphazene-based covalent organic framework (PT-COF) designed for the effective and selective removal of lead ($Pb^{2+}$) ions from aqueous solutions. Synthesized via a solvothermal method using hexa(4-formyl-phenoxy)cyclotriphosphazene aldehyde and 1,3,5-tris-(4-aminophenyl)triazine, the PT-COF exhibits an unprecedented adsorption capacity of 940 mg/g and reaches adsorption equilibrium within 20 minutes. The PT-COF demonstrates exceptional selectivity for $Pb^{2+}$ ions over other heavy metals and provides a visual feedback mechanism, transitioning from yellow to dark brown upon lead adsorption, reverting to yellow upon desorption with acid treatment. The synthesis method yields a mesoporous material with high thermal and chemical stability, maintaining its crystalline structure under harsh conditions. The chemisorptive adsorption of lead ($Pb^{2+}$) ions follows a pseudo-second-order kinetic model, fitting well into the Langmuir isotherm. This disclosure encompasses both the PT-COF product and the method for its synthesis, offering a sustainable and economically viable solution for lead remediation and water purification.

7 Claims, 11 Drawing Sheets

(51) Int. Cl.
  *B01J 20/30* (2006.01)
  *C02F 1/28* (2023.01)
  *C07F 9/6521* (2006.01)
  *C02F 101/20* (2006.01)

SYNTHESIS OF PHOSPHAZENE-COVALENT ORGANIC FRAMEWORK (COF) FOR ENHANCED LEAD CAPTURE WITH VISUAL FEEDBACK

CROSS REFERENCE TO RELATED APPLICATION

This application is a divisional of U.S. application Ser. No. 18/665,132, filed 15 May 2024, the entire disclosure of which is incorporated herein by reference.

FIELD OF THE INVENTION

The present invention relates to the field of environmental technology for targeted heavy metal remediation, and more particularly development of novel materials for enhanced lead capture from aqueous solutions.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

Industrial activities, ranging from agriculture to mining, plating, and battery manufacturing, have played a significant role in releasing heavy metals, notably lead ($Pb^{2+}$) ions, into aquatic environments. These pollutants are notoriously hazardous, exhibiting both toxicity and bioaccumulative properties, pose substantial risks to ecological equilibrium and human health. The urgency to address this environmental threat is underscored by the detrimental impacts on aquatic ecosystems and the potential for human exposure through contaminated drinking water sources. Conventional methods employed for the removal of heavy metals from water, such as chemical precipitation, ion exchange, nanofiltration, adsorption, and membrane separation, have been indispensable but often fall short in meeting the increasing demands for effective remediation. Challenges persist, including limited adsorption capacity, complex post-treatment separation processes, and inadequate selectivity. These limitations hinder the efficacy and efficiency of traditional approaches, necessitating the exploration of alternative solutions that offer improved performance and sustainability.

The mission for better solutions has led to the development of many innovative adsorbents to be used in the field of heavy metal remediation and water treatment. Analysis of related prior art on adsorbents showed discussions of metal-organic frameworks (MOFs), covalent organic frameworks (COFs), hyper-cross-linked polymers (HCPs), and porous aromatic frameworks (PAFs), which have shown promise due to enhanced surface area, stability, and functionality. In recent years, significant progress has been made in developing covalent organic frameworks (COFs) as effective adsorbents for lead ions. Another prior art discusses amide-based COFs capable of adsorbing up to 185.7 mg/g of lead, sulfhydryl-functionalized COFs with capacities of 239 mg/g, and triazine and hydroxyl bifunctionalized COFs reaching up to 476 mg/g. Furthermore, carboxyl-functionalized COFs have achieved adsorption capacities as high as 559 mg/g with rapid equilibrium times.

Despite these advancements, a critical gap remains in the existing technologies for lead remediation and a pressing need for significant improvement to address key issues of efficiency, selectivity, and operational feasibility. Eventhough advancements are made in COF-based adsorbents, there are several critical challenges that hinder their practical application and large-scale implementation. These challenges stem from various factors related to the properties and characteristics of COFs, as well as the requirements for effective water remediation. Firstly, the performance of COFs under real-world conditions may not always meet expectations. Factors such as variations in water chemistry, temperature, and pH levels can influence the adsorption efficiency of COFs. Therefore, there is a need to optimize COF formulations and synthesis methods to ensure consistent and reliable performance across different environmental conditions. Secondly, selectivity is a crucial aspect of any water remediation technology, especially when dealing with complex mixtures of contaminants. While COFs have shown promising selectivity towards lead ions, achieving high selectivity under diverse water compositions remains a challenge. Improving the selectivity of COFs to specifically target lead ions while minimizing the adsorption of other ions and cross reactions is essential for their practical application in real-world scenarios.

Operational feasibility is another critical consideration where factors such as cost-effectiveness, ease of regeneration, and compatibility with existing water treatment infrastructure play a significant role in determining the feasibility of deploying adsorbents in industrial-scale remediation projects. Developing efficient regeneration methods and integration strategies to minimize operational costs and streamline the remediation process is essential for maximizing the practical utility of COF-based adsorbents. Furthermore, the reproducibility and scalability of lead adsorbents need to be optimized to meet the demands of industrial-scale water treatment applications. Additionally, the stability and durability of adsorbents over extended periods of use is essential for their long-term performance and sustainability.

Overall, addressing these challenges requires a multidisciplinary approach that combines materials science, chemistry, engineering, and environmental science. Collaborative efforts between researchers, engineers, and industry stakeholders are essential to overcome the existing gaps in COF-based adsorbents and realize their full potential for efficient, selective, and scalable water remediation solutions Achieving a breakthrough in this domain requires the development of a structurally optimized COF-based solution that not only addresses the challenges of lead removal more efficiently than existing technologies but also offers enhanced efficiency, selectivity, and scalability. The aim is disclose such a solution, poised to revolutionize the landscape of lead remediation technologies and address the pressing environmental and health concerns associated with heavy metal pollution in water systems.

Based on the above explained, there exists a need for an advanced lead-capture material for efficient water purification, which overcomes the drawbacks of the traditionally employed systems.

SUMMARY OF THE INVENTION

Therefore it is an object of the present invention to propose an advanced lead-capture material for selective lead removal from aqueous solutions or contaminated water with a visual indication, which is proved to be efficient, cost-effective, and sustainable.

There is disclosed a nitrogen-phosphazene-based covalent organic framework (PT-COF) for selective removal of lead ($Pb^{2+}$) ions from an aqueous solution, characterized by solvothermal synthesis using hexa(4-formyl-phenoxy)cyclotriphosphazene aldehyde and 1,3,5-tris-(4-aminophenyl) triazine, and possessing a visual feedback mechanism indicating the adsorption of the lead ions.

In an embodiment of the present invention, the PT-COF demonstrates selectivity for $Pb^{2+}$ ions over other heavy metals such as $Cu^{2+}$, $Co^{2+}$, or $Ni^{2+}$.

In an embodiment of the present invention, the PT-COF offers an adsorption capacity of 940 mg/g and reaches adsorption equilibrium in 20 minutes.

In another embodiment of the present invention, the PT-COF provides the visual feedback mechanism comprises the PT-COF changing colour from yellow to dark brown upon adsorbing the lead ions, thereby visually confirming the adsorption and the PT-COF reverting to its original yellow colour when treated with an acid, indicating release of the adsorbed lead ions, and the visual feedback mechanism thereby enables monitoring of adsorption status.

In an embodiment of the present invention, the solvothermal synthesis of the PT-COF occurs in a solvent system comprising a mixture of 1,2-dichlorobenzene and n-butanol (9:1 v/v), with 6 M acetic acid as a catalyst, resulting in inclusion of nitrogen-rich phosphazene into a covalent organic framework.

In an embodiment of the present invention, the PT-COF is mesoporous with Brunauer-Emmett-Teller (BET) surface area of 1120 $m^2/g$ and a total pore volume of 1.53 $cm^3/g$.

In another embodiment of the present invention, the PT-COF is characterized by high thermal and chemical stability, wherein it maintains crystalline structure when exposed to harsh environmental conditions.

In an embodiment of the present invention, wherein the adsorption of the lead ($Pb^{2+}$) ions on the PT-COF is chemisorptive and follows pseudo-second-order kinetic model.

In an embodiment of the present invention, wherein the isotherms of the adsorption of the lead ($Pb^{2+}$) ions on the PT-COF fit into Langmuir model.

In another embodiment, the PT-COF exhibits recycling stability and reusability after multiple cycles of adsorption and desorption.

There is disclosed a method for synthesizing a nitrogen-phosphazene-based covalent organic framework (PT-COF) for selectively adsorbing and removing lead ($Pb^{2+}$) ions from aqueous solutions, the method comprising reacting hexa(4-formyl-phenoxy) cyclotriphosphazene aldehyde with 1,3,5-tris-(4-aminophenyl)triazine in a solvent mixture of 1,2-dichlorobenzene and n-butanol, wherein the resulting PT-COF possesses a visual feedback mechanism indicating adsorption of the lead ions.

In an embodiment of the present invention, wherein the method is a solvothermal reaction of hexa(4-formyl-phenoxy)cyclotriphosphazene aldehyde with 1,3,5-tris-(4-aminophenyl) triazine in the solvent mixture of 1,2-dichlorobenzene and n-butanol of ratio 9:1 v/v, with acetic acid as a catalyst.

In another embodiment of the present invention, wherein the method further comprises maintaining the reaction mixture at 120° C. for 7 days; filtering and washing resultant product sequentially with dimethylformamide (DMF), acetone, and tetrahydrofuran (THF); and subsequently activating and drying the resultant product at 50° C. under vacuum overnight to yield a yellowish crystalline solid of the PT-COF.

In an embodiment of the present invention, wherein the visual feedback mechanism comprises the PT-COF changing colour from yellow to dark brown upon adsorbing the lead ions, thereby visually confirming the adsorption and the PT-COF reverting to its original yellow colour when treated with an acid, indicating release of the adsorbed lead ions, and the visual feedback mechanism thereby enables monitoring of adsorption status.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION OF THE INVENTION

Figure 1:
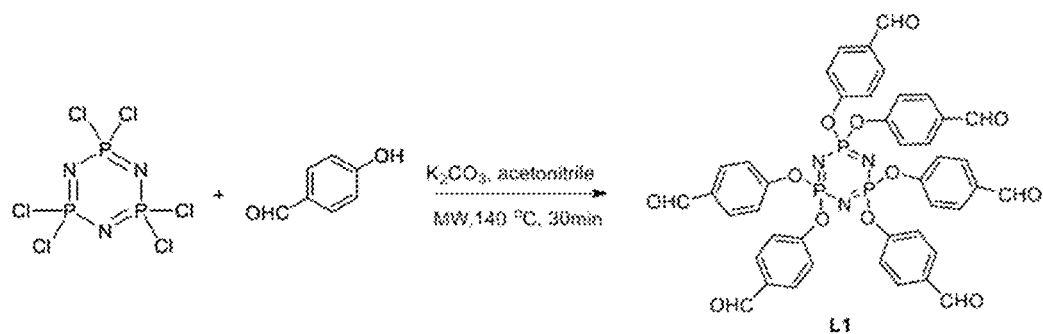
FIG. 1 shows the synthesis of hexa(4-formyl-phenoxy) cyclotriphosphazene (L1), in accordance with the present invention.

The aspects of the proposed nitrogen-phosphazene-based covalent organic framework (PT-COF) for selective lead removal with a visual indication-according to the present invention will be described in conjunction with FIGS. 1-13. In the Detailed Description, reference is made to the accompanying figures, which form a part hereof, and which is shown by way of illustration specific embodiments by which the invention may be practiced. It is to be understood that other embodiments may be utilized and logical changes may be made without departing from the scope of the present invention. The following detailed description, therefore, is not to be taken in a limiting sense, and the scope of the present invention is defined by the appended claims.

The present invention proposes a nitrogen-phosphazene-based covalent organic framework (PT-COF), engineered as a reagent for the effective and selective removal of heavy metal ions from aqueous solutions or contaminated water. The proposed PT-COF compound is synthesized via a solvothermal method using hexa(4-formyl-phenoxy)cyclotriphosphazene aldehyde and 1,3,5-tris-(4-aminophenyl)triazine. The material exhibts a remarkable adsorption capacity of 940 mg/g, which is substantially higher than existing adsorbent materials. This superior adsprtion capacity is employed for removal of contaminant ions from solutions. The proposed PT-COF reagent also demonstrates remarkable speed in achieving purification, by reaching its full adsorption capacity within minutes. It is specifically selective for lead ($Pb^{2+}$) ions, which enhances its utility in complex contamination scenarios involving lead. PT-COF is capable of reaching adsorption equilibrium in just 20 minutes, thereby removing lead ions effectively and rapidly during its application. A distinctive feature is that it provides a practical visual indicator of saturation by changing color from yellow to dark brown when lead ions are adsorbed, which simplifies monitoring the overall adsorption process.

The significance of the invention is that the material is designed to selectively remove lead ($Pb^{2+}$ ions), which is known to be one of the most persistent and dangerous pollutants in the water systems. The solution is specifically engineered to remove lead ions rapidly and effectively from contaminated water by adsorbing them into the proposed PT-COF material, thus offering a superior alternative to traditional methods that often fall short in efficiency and selectivity. The synthesized PT-COF effectively binds and removes lead ions, and it reaches full adsorption capacity within minutes indicating rapid action. It is specifically designed to be highly selective, targeting lead ions over other potential contaminants, which makes it particularly valuable in diverse and complex environmental conditions. The proposed reagent material also enables a visual feedback mechanism, by which during the lead purification-by-adsorption process, the material changes color from yellow to dark brown upon successful adsorption of lead ions. As a result, it can serve as a visual indicator, providing an easy and effective way to monitor the purification process and assess the saturation of the adsorbent.

The proposed reagent material is characterized by high thermal and chemical stability, enhancing its durability and suitability for a variety of harsh environmental conditions. It possesses robust recycling capabilities, signifying long-term usability and sustainability. The PT-COF can be recycled and reused up to five times, without requiring frequent replacements. This ability to recycle and reuse underscores its sustainability and economic value for industrial applications, with minimized wastage of resources, pollution and environmental impact. The recyclability feature, combined with its high efficiency and intuitive use, positions the so-prepared PT-COF compound as an ideal choice for industrial applications focused on water purification and mitigation of environmental lead contamination. The product finds application across many sectors including mining, agriculture, and manufacturing, where lead contamination is prevalent. The proposed invention sets a new standard in water treatment technologies, providing an efficient, reliable, and environmentally friendly solution to one of the most significant pollution challenges. It represents a major step forward in commitment to safer, cleaner water and a healthier planet.

In an embodiment of the invention nitrogen-phosphazene-based covalent organic framework (PT-COF) is synthesized solvothermally through a [6+3] imine condensation reaction that results in a structural network consisting of imine and triazine groups or functionalities. The nitrogen-rich phosphazene is thereby included in the framework which contributes to its high performance. The process involves the reaction of hexa(4-formyl-phenoxy) cyclotriphosphazene aldehyde with 1,3,5-tris-(4-aminophenyl)triazine. The reaction takes place in a solvent system formed by a mixture of 1,2-dichlorobenzene and n-butanol (9:1 v/v), with 6 M acetic acid serving as the catalyst. The reaction mixture is maintained at 120° C. for 7 days. After completion, the resultant product is filtered, washed sequentially with dimethylformamide (DMF), acetone, and tetrahydrofuran (THF), and subsequently activated and dried at 50° C. under vacuum overnight. This yields a yellowish crystalline solid which constitutes the nitrogen-phosphazene-based covalent organic framework or the PT-COF.

The effectiveness of PT-COF in capturing $Pb^{2+}$ by adsorption is attributed to the molecular interaction dynamics at the reaction sites within the PT-COF network for the inclusion of $Pb^{2+}$ into the framework. PT-COF has unique structure and functional properties contributed by its synthesis from hexa(4-formyl-phenoxy)cyclotriphosphazene aldehyde and 1,3,5-tris-(4-aminophenyl)triazine through a solvothermal method. The imine and triazine functionalities thereby included within the PT-COF network, play an integral role in the binding mechanism, through coordination or complexation with the lead ($Pb^{2+}$) ions. The imine and triazine groups act as the primary sites for $Pb^{2+}$ binding, and very strong interactions occur between COF's functional groups and $Pb^{2+}$ ions. These complex interaction dynamics at the molecular level changes the electronic structure of the COF, which alters the energy levels and the electronic transitions of the material. This results in a strong binding affinity and the formation of stable lead complexes within the framework. Therefore, the inclusion of nitrogen-rich phosphazene in the PT-COF framework contributes to its high performance in lead ion capture. The PT-COF compound has a crystalline structure of high strength and stability, that remains conserved even when exposed to harsh thermal/chemical environments. This unaltered crystallinity underlines the robustness, thermal stability, high chemical resistance and resilience of PT-COF under aggressive conditions.

The kinetics and adsorption isotherms of lead adsorption on PT-COF are better fitted by the pseudo-second-order model and the Langmuir model, respectively. The pseudo-second-order kinetic model assumes that the rate-limiting step may involve chemisorption involving valence forces through sharing or exchange of electrons between adsorbent and adsorbate. This model's high correlation suggests that the adsorption process is chemisorptive and involves the chemical bonding of $Pb^{2+}$ ions onto the active sites of PT-COF. These kinetics insights demonstrate the efficiency of PT-COF in rapidly removing lead. The highly selective behavior of the PT-COF even in the presence of other competitive metal ions such as $Cu^{2+}$, $Co^{2+}$, and $Ni^{2+}$ stems from the unique electronic and spatial configuration of the COF, which aligns well with the ionic radius of $Pb^{2+}$ compared to other metals present.

The invention, a nitrogen-phosphazene-based covalent organic framework (PT-COF), introduces several features that differentiate it from existing adsorbents. The compound particularly targets at lead ($Pb^{2+}$) ions and removes them from aqueous solutions. The significant features of the PT-COF include its structural design, an exceptional adsorption capacity, rapid adsorption kinetics, selective adsorption, a visual feedback mechanism, its chemical and thermal stability and robust recycling stability. These features prove to be advantageous in numerous practical applications and the PT-COF presents itself as an effective solution in the field of heavy metal remediation and water treatment. The PT-COF is synthesized from hexa(4-formyl-phenoxy)cyclotriphosphazene aldehyde and 1,3,5-tris-(4-aminophenyl) triazine through a solvothermal method, which contributes to its unique structural and functional properties. The approach ensures the inclusion of nitrogen-rich phosphazene in the framework, contributing to its high performance in lead ion capture. Considering the adsorption capacity, the PT-COF exhibits a remarkable adsorption capacity of 940 mg/g for $Pb^{2+}$, which significantly exceeds the capacities of currently known adsorbents. This high capacity results in a more efficient removal process, requiring less material and potentially reducing the cost and complexity of water treatment systems during its application. The PT-COF achieves adsorption equilibrium within a very short time of 20 minutes, indicative of rapid adsorption kinetics. This rapid action is highly advantageous for practical applications where quick water treatment is essential, such as in industrial effluent processing or emergency water purification scenarios. The proposed framework demonstrates exceptional selectivity for $Pb^{2+}$ ions over other heavy metals in adsorption, which is critical in complex environmental matrices where multiple types of contaminants are present. This selectivity ensures that the PT-COF can be effectively used in targeted remediation efforts without being compromised by other substances. The PT-COF also provides a visual feedback mechanism, wherein the PT-COF changes color from yellow to dark brown upon adsorption of lead ions. This feature can be used as a simple, visual method of monitoring the adsorption process and determining when the material has reached saturation. The visual indicator feature is distinct and adds practical value in operational settings. Regarding chemical and thermal stability, the PT-COF's robust structure maintains its integrity and performance under a variety of environmental conditions, including thermal and chemical exposures, which enhances its applicability in industrial processes involving variable temperatures and harsh chemical environments. The PT-COF shows excellent recycling stability and reusability after multiple cycles of adsorption and desorption, indicating its potential for long-term and repeated use in industrial and environmental applications. This durability not only enhances the economic viability of the adsorbent but also contributes to environmental sustainability.

The distinctive characteristics of the PT-COF offer significant benefits, especially in the field of environmental cleanup and water treatment, including: (1) Efficiency in Operation: With an exceptional adsorption capacity of 940 mg/g, the PT-COF enables more efficient removal of lead ions, potentially decreasing the volume of adsorbent material required for removal and reducing the frequency of adsorbent changes. This efficiency can lead to operational cost savings and enhanced treatment capabilities in contaminated water systems. (2) Accelerated Treatment Times: The PT-COF achieves adsorption equilibrium within just 20 minutes, significantly expediting the water treatment process. This rapid action is particularly beneficial in scenarios necessitating immediate remediation, such as in response to industrial spills or in situations requiring quick turnover in municipal water systems. (3) High Selectivity: The PT-COF exhibits exceptional selectivity towards $Pb^{2+}$ ions, allowing for effective utilization in environments with complex mixtures of contaminants. This high selectivity helps prevent the wastage of the adsorbent on non-target substances, making the remediation process more specific and efficient. (4) Clear Visual Indication: The PT-COF undergoes a visible color change from yellow to dark brown upon adsorption, providing a straightforward, visual indication of the material's saturation. This feature facilitates easier monitoring and maintenance of the adsorption process. (5) Long-term Usability: The robust recycling stability of PT-COF not only extends its lifespan but also reduces the frequency of replacements, leading to cost savings and environmental benefits over the long term. (6) Environmental Sustainability: By enabling effective lead removal, the PT-COF contributes to safer, cleaner water, reducing the ecological and health impacts of lead contamination. Furthermore, its reusability aligns with sustainability goals by minimizing waste and the environmental footprint of water treatment processes. (7) Application Potential: The unique synthesis and structure of the PT-COF not only provide practical benefits in lead ion adsorption but also open avenues for the development of similar frameworks for other types of contaminants, potentially broadening the scope of applications in environmental remediation technologies.

In an embodiment of the invention, the nitrogen-phosphazene-based covalent organic framework (PT-COF) is synthesized by a solvothermal method from hexa(4-formyl-phenoxy) cyclotriphosphazene aldehyde and 1,3,5-tris-(4-aminophenyl)triazine, which form the linkers L1 and L2 respectively. In another embodiment of the invention, is enabled the synthesis of linkers L1 and L2.

According to an embodiment of the present invention, hexa(4-formyl-phenoxy) cyclotriphosphazene (L1) is synthesised by reaction between p-hydroxybenzaldehyde and hexachlorocyclotriphosphazene (HCCP) under controlled conditions. The synthesis of hexa(4-formyl-phenoxy)cyclotriphosphazene is detailed in FIG. 1. Initially, 14.92 g of p-hydroxybenzaldehyde is dissolved in 300 mL of acetonitrile. Subsequently, 33.4 g of potassium carbonate is gradually added to the mixture, which is then stirred in an ice bath for 30 minutes. Following this, 50 mL of a hexachlorocyclotriphosphazene (HCCP, 6.96 g) solution in acetonitrile is slowly introduced into the mixture. After stirring in the ice bath for an additional 2 hours, the reaction mixture is allowed to stir at room temperature for 2 days. The process then concludes with the filtration of the reaction mixture, followed by the decompression distillation of the filtrate to remove acetonitrile. The resultant solid is then extracted with dichloromethane and washed with saturated salt water. The organic phase is dried using anhydrous magnesium sulfate, and the white solid obtained post-decompression distillation is recrystallized from ethyl acetate. Finally, the solid powder is dried at 50° C. under vacuum overnight to yield compound L1, as illustrated in FIG. 1.

Figure 2:
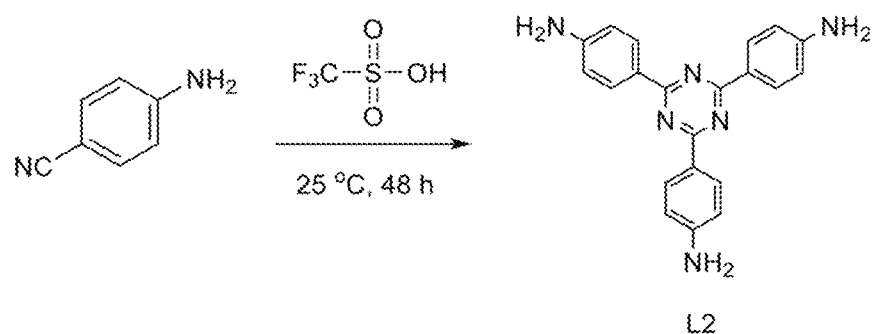
FIG. 2 shows the synthesis of 2,4,6-tris(4-aminophenyl)-1,3,5-triazine (TAPT) (L2), in accordance with the present invention.

In another embodiment of the present invention, 2,4,6-tris (4-aminophenyl)-1,3,5-triazine (TAPT) (L2) is synthesized using 4-amino benzonitrile and trifluoromethanesulfonic acid under controlled reaction conditions. The synthesis of 2,4,6-tris (4-aminophenyl)-1,3,5-triazine (TAPT) is carried out with a slight modification of a previously reported method and is shown in FIG. 2. 4-amino benzonitrile (2 gm) is placed in a 50 mL round bottom flask set up in an ice bath. Trifluoromethanesulfonic acid (2 mL) is then added dropwise to the flask. The solution is stirred at room temperature for 48 hours. Afterwards, the reaction mixture is poured into 200 mL of ice-cold water and neutralized using 2 M sodium hydroxide (NaOH) solution. As the NaOH is added, the solution turns a clear deep yellow, and upon reaching the neutralization point, a deep yellow precipitate is immediately formed. This precipitate is collected by filtration and thoroughly washed with water. It is then dried under vacuum until a constant weight of the pure compound is achieved. Finally, 1.78 g of the pure compound is obtained.

Figure 3:
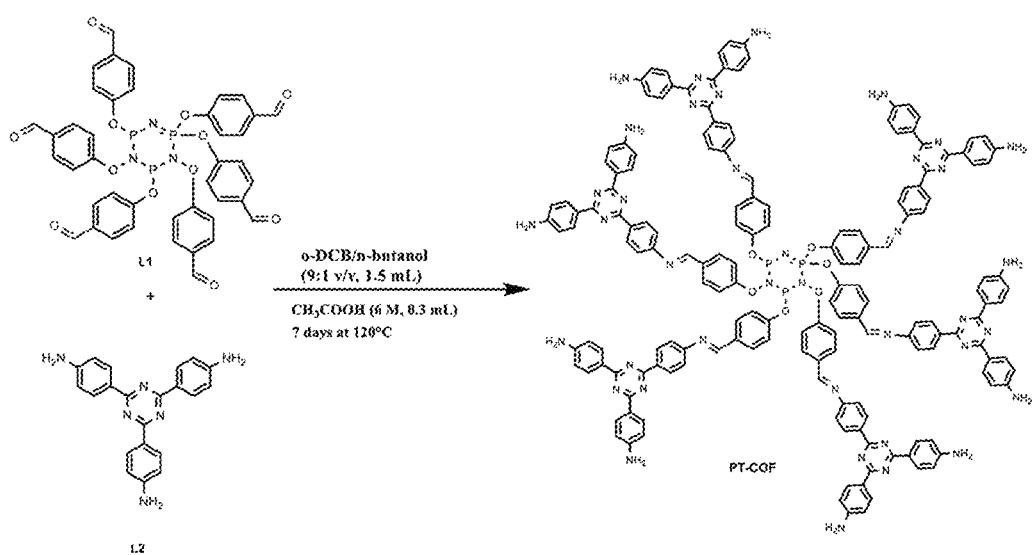
FIG. 3 shows the synthesis of PT-COF, in accordance with the present invention.

In an embodiment of the present invention, nitrogen-phosphazene-based covalent organic framework (PT-COF) is synthesized through a [6+3] imine condensation reaction, involving the reaction of the linkers L1 (hexa(4-formylphenoxy)cyclotriphosphazene aldehyde) with L2 (2,4,6-tris (4-aminophenyl)-1,3,5-triazine) under controlled conditions. FIG. 3 shows the synthesis of PT-COF. The solvent system used is a mixture of 1,2-dichlorobenzene and n-butanol (9:1 v/v), with 6 M acetic acid serving as the catalyst. L1 (86 mg, 0.1 mmol) and L2 (33 mg, 0.3 mmol) are separately placed in a 15 mL pressure vessel, to which 1,2-dichlorobenzene/n-butanol (9:1 v/v, 1.5 mL) is added. Each mixture is then sonicated for 5 minutes to ensure a homogeneous dispersion. Following sonication, the dispersion containing L1 is combined with the L2 dispersion, and the resulting suspension is briefly shaken for about 10 seconds. Subsequently, acetic acid (6 M, 0.3 mL) is slowly introduced into the suspension under a nitrogen atmosphere. After adding the acid, the vessel is sealed, and the reaction mixture is left undisturbed for 7 days at 120° C. The resultant solid is then collected by filtration and washed sequentially with dimethylformamide (DMF), acetone, and tetrahydrofuran (THF). Finally, the powder is activated and dried at 50° C. under vacuum overnight to yield a yellowish crystalline solid of PT-COF.

In an embodiment of the present invention, material characterization is conducted for nitrogen-phosphazene-based covalent organic framework (PT-COF) to analyse its properties and its adsorption mechanism. In an embodiment of the invention, Fourier-transform infrared (FTIR) spectra are acquired using KBr pellets on a FT-IR spectrophotometer (Thermo Nicolet model 470). In another embodiment, Nuclear magnetic resonance (NMR) spectra are recorded using a Varian-400 MHz spectrometer ($^1$H-NMR at 400 MHz and $^{13}$C-NMR at 100 MHz) with dimethyl sulfoxide-$d_6$ (DMSO-$d_6$) as the solvent. Tetramethylsilane (TMS) serves as an internal reference, and chemical shifts are reported in parts per million ($\delta$ values, ppm). In another embodiment of the present invention, Powder X-ray diffraction (PXRD) analysis is performed using a PXRD diffractometer (Shimadzu-6100) with Cu—K$\alpha$ radiation at a wavelength of $\lambda$=1.542 Å. According to this embodiment, diffraction data are collected within the 2$\theta$ range of 20-80° at a rate of 1° C./min. The measurements are conducted at room temperature and atmospheric pressure. Nitrogen ($N_2$) sorption measurements and pore size studies are carried out using a BET Sorptometer (BET-201-AEL), in an embodiment of the disclosure. Measurements at 77 K are performed using a liquid $N_2$ bath. For thermogravimetric analysis (TGA) in an embodiment of the invention, a 0.2 g sample is heated to 600° C. at a rate of 5° C./min, while the weight is continuously monitored as a function of temperature. In another embodiment of the invention, X-ray photoelectron spectroscopy (XPS) is carried out on a ESCALAB 250. Raman scattering spectra are measured on Invia Reflex and Atomic absorption spectroscopy is carried out using a Shimadzu AA-6880 in different embodiments of the invention.

The examination of the chemical stability of PT-COF under various aggressive conditions is conducted in an embodiment, for resilience in challenging environments. The stability tests are conducted over a 24-hour period at room temperature, using solvents such as boiling water, ethanol, N,N-dimethylformamide (DMF), and dimethyl sulfoxide (DMSO), as well as acidic and basic solutions (3 M HCl and 3 M NaOH, respectively) maintained at 25° C. and the PT-COF samples are subjected to Powder X-ray Diffraction (PXRD).

According to the present disclosure, various experiments are conducted for analysing adsorption mechanism of PT-COF. In an embodiment of the present invention, the kinetics of adsorption is analysed using experimental methods. For this test, 10.0 mg of PT-COF is introduced to each 10 mL solution containing an initial lead (Pb) concentration of 800 mg/g. The pH is adjusted to 5-6 using 0.05 M solutions of HCl and NaOH. The adsorbed quantity of COF material ($Q_e$, mg/g) at equilibrium is calculated using the following equations, Equation (1) and Equation (2) where Pb (II) ion concentration in the solution is determined by atomic absorption spectroscopy.

$$Q_e = \frac{(C_0 - C_e)V}{m} \quad (1)$$

$$Q_t = \frac{(C_0 - C_t)V}{m} \quad (2)$$

The adsorption capacity at equilibrium and the related adsorption period t are indicated by $Q_e$ (mg g$^{-1}$) and $Q_t$ (mg g$^{-1}$) (h). The initial concentration and the concentration at time t are $C_0$ (mg g$^{-1}$) and $C_t$ (mg g$^{-1}$), respectively, $C_e$ (mg g$^{-1}$) is the equilibrium concentration, V (mL) is the volume of the water sample, and m (mg) is the mass of PT-COF. The adsorption data are described by the pseudo-first-order kinetic model and the pseudo-second-order kinetic model according to the following Equation (3) and Equation (4):

$$\ln(Q_e - Q_t) = -k_1 t + \ln Q_e \quad (3)$$

$$\frac{t}{Q_t} = \frac{t}{Q_e} + \frac{1}{k_2 \times Q_e^2} \quad (4)$$

The rate constants of pseudo-first-order and pseudo-second-order are expressed individually by $k_1$ (min$^{-1}$) and $k_2$ (mg g$^{-1}$ min$^{-1}$), respectively. In another embodiment of the disclosure, an investigation into the effect of pH on PT-COF's lead adsorption capabilities is conducted to provide details about its functional performance under varying acidic and basic conditions. The study methodically adjusts the PH levels from 2 to 7, maintaining a constant lead concentration of 800 mg/g to directly observe the effect of pH on lead uptake by PT-COF and the results are further analysed.

In an embodiment of the present invention, an isothermal adsorption study is performed using isothermal adsorption tests. For the tests, 10 mg of PT-COF is added to each 10 mL solution, with concentrations ranging from 50 to 1900 mg g$^{-1}$. The mixtures are then agitated at various temperatures ranging from 288 K to 318 K for a duration of 20 hours. To analyze the adsorption data, both the Freundlich and Langmuir equations are employed. These equations help to model the adsorption isotherms and provide insights into the adsorption characteristics of PT-COF under different temperature conditions. Langmuir equation is represented by Equation (5) and Freundlich equation is represented by Equation (6).

$$Q_e = \frac{K_L \times Q_m \times C_e}{1 \times K_L \times C_e} \quad (5)$$

$$Q_e = K_F \times C_e^{1/n_F} \quad (6)$$

where $Q_m$ (mg g$^{-1}$) is the maximum adsorption capacity, $K_L$ (L mg$^{-1}$) is the Langmuir isotherm adsorption constant, and nr and KF are the Freundlich isotherm adsorption constants.

In an embodiment of the present invention, selectivity test is conducted to analyse the selectivity of PT-COF. The selectivity of PT-COF for different metal ions is evaluated using $Pb^{2+}$, $Ni^{2+}$, $Cd^{2+}$, and $Co^{2+}$. For each test, 10.0 mg of PT-COF is added to 10 mL of each working solution, which contains a concentration of 500 mg g$^{-1}$ of the respective metal ion. The mixtures are then shaken for 24 hours to determine the adsorption efficiency of PT-COF towards each type of ion. In another embodiment of the present invention, a reusability study is conducted to analyse the reusability stability of PT-COF for reuse. For the reusability test, 10 mg of PT-COF is introduced into 10 mL of a $Pb^{2+}$ solution with a concentration of 250 mol L$^{-1}$. The adsorption is allowed to proceed for 24 hours. After this period, 2 mL of 0.1 mol L$^{-1}$ HCl solution is used to elute the adsorbed $Pb^{2+}$ from the PT-COF. The eluted material is then reused in five additional cycles of adsorption to assess the reusability of the PT-COF.

Figure 4A:
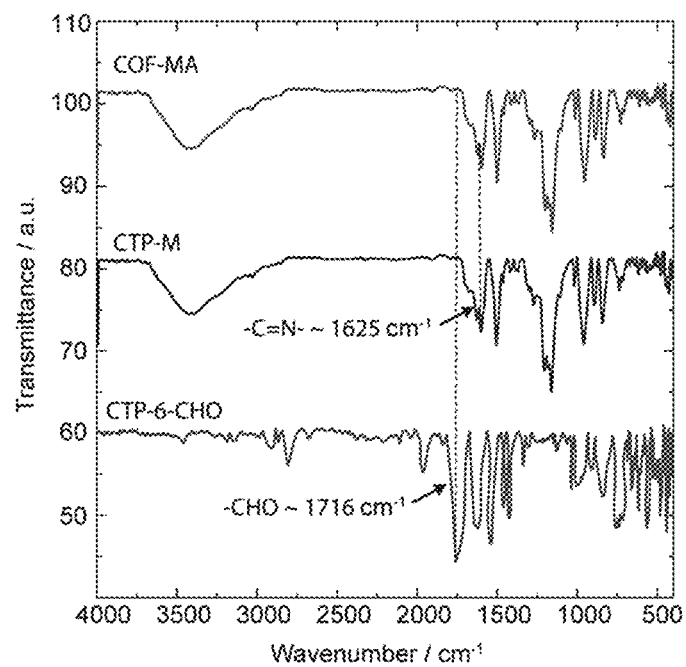
FIG. 4A shows FT-IR of PT-COF and FIG. 4B shows PXRD of PT-COF, in accordance with the present invention.
Figure 4B:
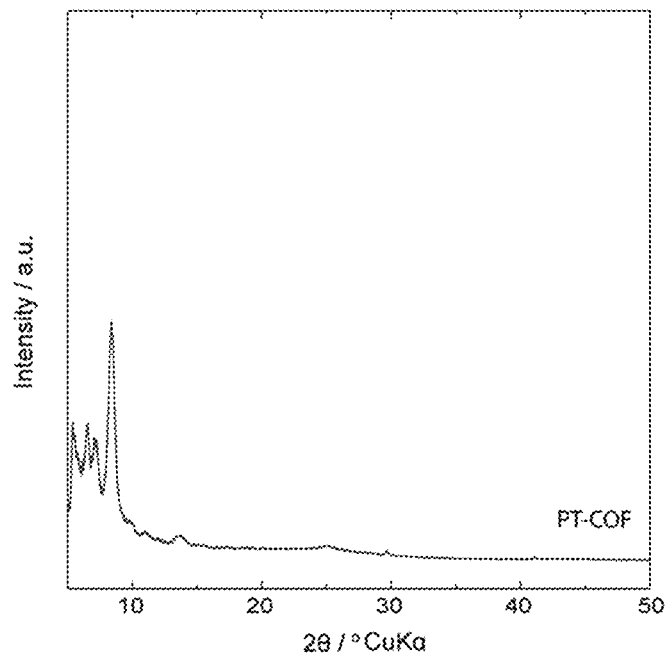
Figure 4C:
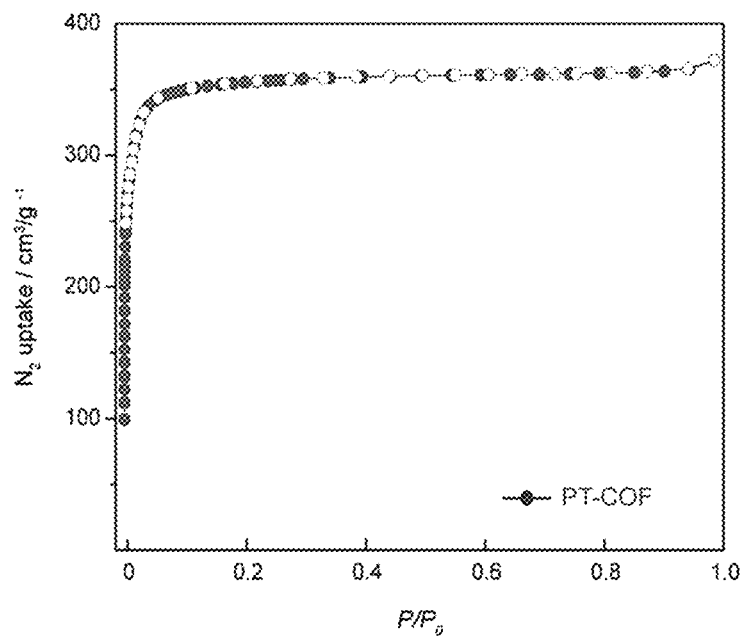
FIG. 4C and FIG. 4D show $N_2$ sorption isotherms at 77 K of PT-COF and pore size distribution of PT-COF respectively, in accordance with the present invention.
Figure 4D:
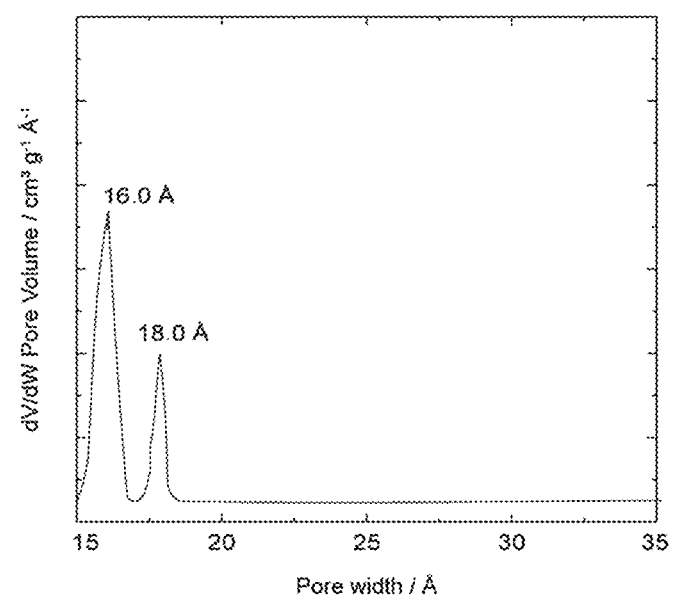

Characterization of PT-COF is analysed as per an embodiment of the invention. Fourier-transform infrared spectroscopy (FT-IR) results are shown in FIG. 4A. The results show a significant reduction in the diffraction peaks associated with the amino and aldehyde groups, with the emergence of a new peak at 1625 cm$^{-1}$ corresponding to the —C═N— stretching band, consistent with the model compound CTP-M. The crystallinity of PT-COF is verified through powder X-ray diffraction (PXRD) analysis and the results are shown in FIG. 4B. Distinct diffraction peaks are observed at 4.728, 7.065, 8.321, 9.535, 12.382, and 25.088, indicating a high degree of crystallinity. FIG. 4C and FIG. 4D show the results for $N_2$ sorption measurements and pore size studies respectively, carried out using a BET Sorptometer. FIG. 4C represents $N_2$ sorption isotherms at 77 K of PT-COF and FIG. 4D shows the pore size distribution of PT-COF. Nitrogen adsorption at 77 K reveals the porosity of the COF, with a sharp uptake below P/P$_0$=0.05, indicative of mesopores. The Brunauer-Emmett-Teller (BET) surface area is measured at 1120 m$^2$/g, with a total pore volume of 1.53 cm$^3$/g as per FIG. 4C. Pore-size distribution shows diameters primarily around 1.6 nm and 1.81 nm as shown in FIG. 4D.

Figure 4E:
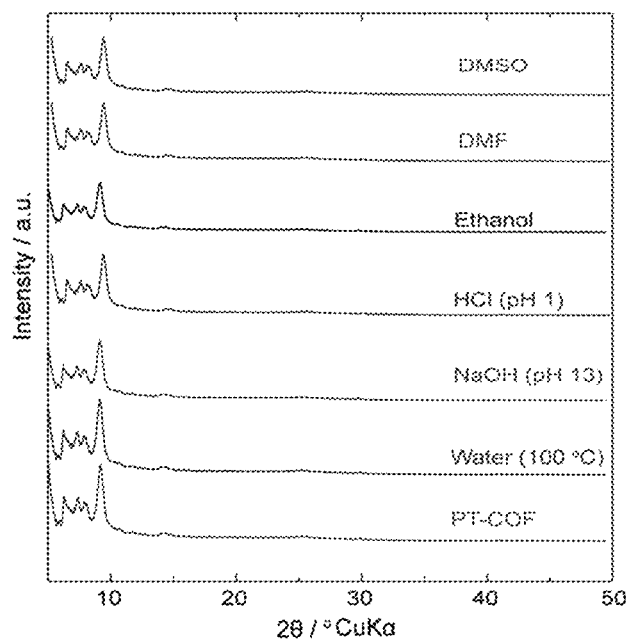
FIG. 4E shows PXRD patterns of PT-COF after the treatment in different organic solvents for 24 hours, in accordance with the present invention.
Figure 4F:
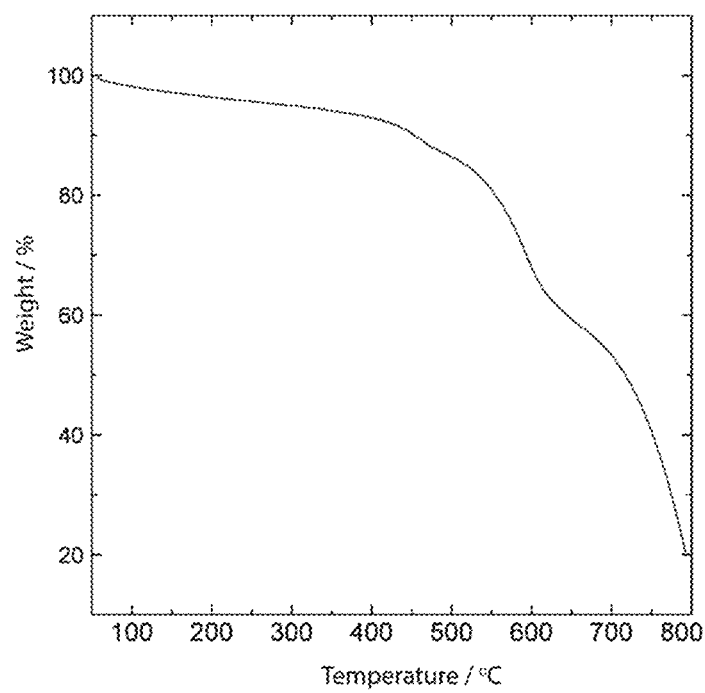
FIG. 4F shows TGA of PT-COF, in accordance with the present invention.

The examination of the chemical stability of PT-COF under various aggressive conditions reveals its remarkable resilience, critical for applications in challenging environments. The stability tests are conducted over a 24-hour period at room temperature, using solvents such as boiling water, ethanol, N,N-dimethylformamide (DMF), and dimethyl sulfoxide (DMSO), as well as acidic and basic solutions (3 M HCl and 3 M NaOH, respectively) maintained at 25° C. FIG. 4E shows the PXRD patterns of PT-COF after the treatment in different organic solvents for 24 hours. The results from these tests are quite effective. The Powder X-ray Diffraction (PXRD) patterns of the PT-COF samples do not exhibit any shift or degradation, affirming that the crystalline structure of PT-COF is conserved. This unaltered crystallinity after exposure to harsh chemical environments underlines the robustness of PT-COF, enhancing its appeal for further chemical modification and applications that demand high chemical resistance. Furthermore, thermogravimetric analysis (TGA) of PT-COF, depicted in FIG. 4F and conducted under a nitrogen atmosphere, provides further evidence of PT-COF's thermal stability. The analysis shows that PT-COF does not undergo significant thermal degradation until reaching temperatures as high as 450° C. This high thermal stability is indicative of PT-COF's potential for use in applications that may experience high temperatures, further broadening its utility across various fields. Together, these findings not only confirm the exceptional chemical and thermal stability of PT-COF but also highlight its suitability as a candidate for future functionalization and application in environments where other materials might fail. This makes PT-COF a compelling choice for further exploration and development in material science and engineering domains.

Figure 5A:
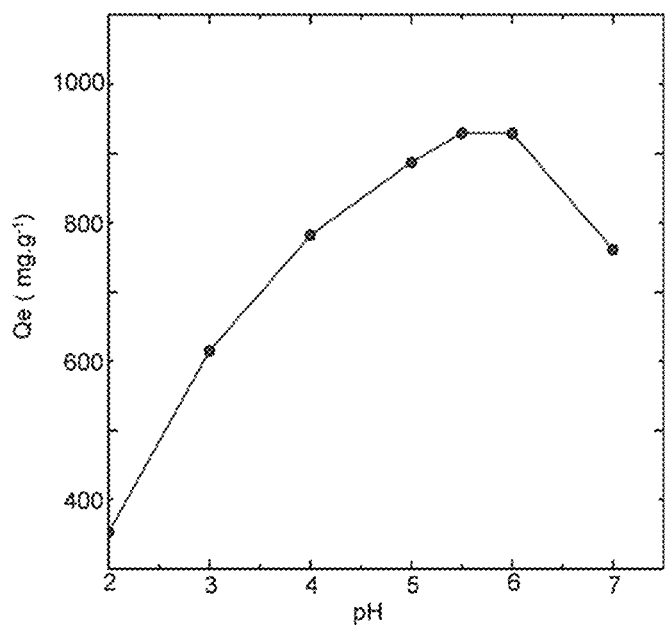
FIG. 5A shows the effect of pH on the adsorption capacity of $Pb^{2+}$ on COF, in accordance with the present invention.
Figure 5B:
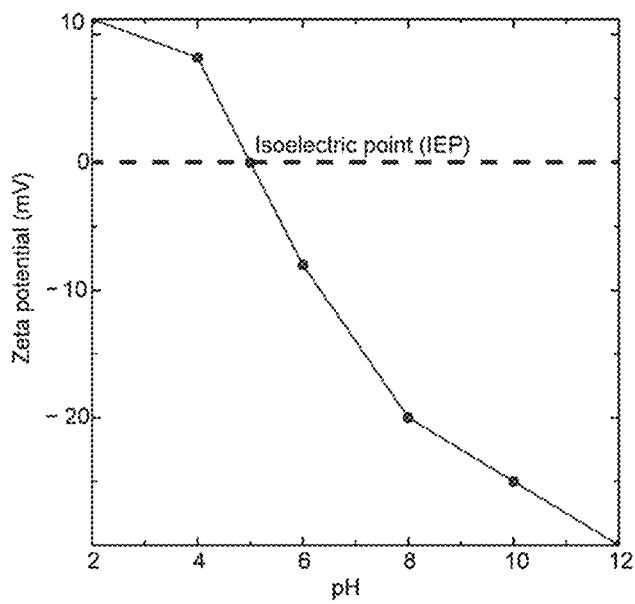
FIG. 5B shows pH vs. zeta potential plots of PT-COF, in accordance with the present invention.

The investigation into the pH dependence of PT-COF's lead adsorption capabilities is conducted to provide details about its functional performance under varying acidic and basic conditions. The study methodically adjusts the PH levels from 2 to 7, maintaining a constant lead concentration of 800 mg/g to directly observe the effect of pH on lead uptake by PT-COF. Notably, as the pH increases, so does the adsorption efficiency, with the maximum adsorption observed at pH 6 where PT-COF absorbs 938 mg/g of $Pb^{2+}$ ions. This peak performance underscores the optimal conditions for PT-COF in lead removal applications. The observed trend in lead adsorption is involvedly linked to the isoelectric point (IEP) of PT-COF, which is at pH 5.10. At pH values above this IEP, the PT-COF surfaces acquire a negative charge, enhancing their ability to attract and bind positively charged Pb(II) ions. Conversely, below this pH value, the COF's surface becomes positively charged, which diminishes its affinity for Pb(II) due to electrostatic repulsion. This interaction dynamics highlights the critical role of pH in modulating the charge properties of PT-COF and thereby influencing its adsorption performance. In an acidic environment characterized by low pH, the presence of more protons (H$^+$) on the COF surface leads to competition with lead ions (Pb$^{2+}$) for binding sites on the COF. This competition reduces lead ion adsorption onto the COF material. While, in a basic environment with high pH, the presence of hydroxide ions (OH$^-$) in the solution can react with lead ions to form less soluble compounds. The formation of these less soluble compounds reduces the concentration of available lead ions for adsorption onto the COF. The adsorption behavior at different pH levels indicates practical strategies for the operational use of PT-COF in environmental cleanup. For instance, at pH 6, the COF exhibits optimal lead adsorption, making it highly suitable for treatment processes in mildly acidic waters. On the other hand, in more acidic conditions where the pH is lower, PT-COF can potentially be used to facilitate the desorption and recovery of lead, making it an essential feature for the regeneration and reuse of the adsorbent material. These results are visually represented in FIG. 5A and FIG. 5B, which display the correlation between pH levels and lead adsorption/desorption capacities of PT-COF. FIG. 5A represents the effect of pH on the adsorption capacity of $Pb^{2+}$ on COF. FIG. 5B represents pH vs. zeta potential plots of PT-COF. These graphical illustrations convey how pH impacts PT-COF's effectiveness, providing clear guidelines for its application in different environmental settings. A comprehensive understanding of these mechanisms enables the effective utilization of PT-COF in lead remediation, ensuring that environmental interventions are both efficient and adaptable to varying conditions. This enhances the sustainability and effectiveness of water treatment technologies.

Figure 6A:
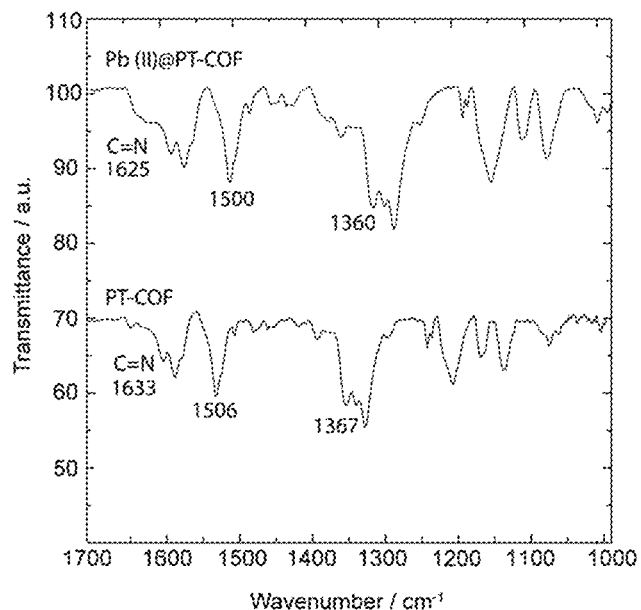
FIG. 6A shows FTIR spectra of PT-COF and Pb (II) @PT-COF, in accordance with the present invention.
Figure 6B:
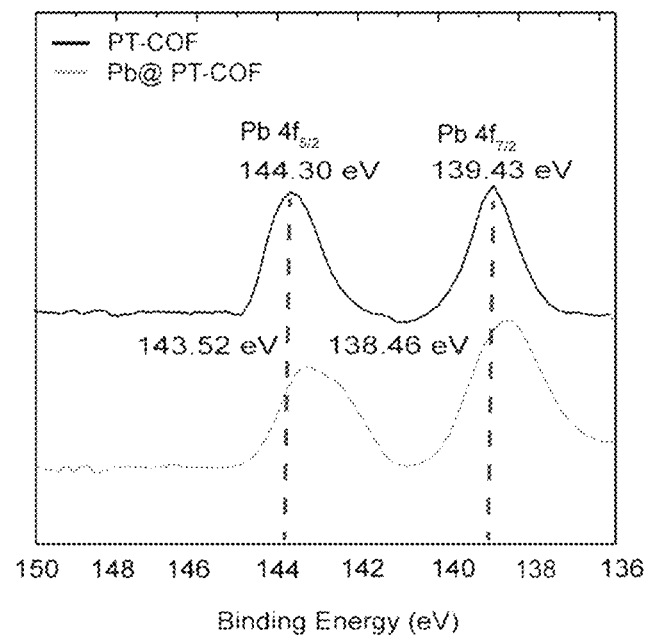
FIG. 6B shows XPS spectra of PT-COF after adsorption of $Pb^{2+}$ and module compound $Pb(NO_3)_2$, in accordance with the present invention.

Following the adsorption of $Pb^{2+}$ ions, FTIR analysis of PT-COF is conducted to investigate its $Pb^{2+}$ adsorption mechanism. FIG. 6A shows FTIR spectra of PT-COF and Pb(II)@PT-COF (that is, PT-COF after adsorption of $Pb^{2+}$). FTIR analysis shows significant shifts in the imine group peaks, particularly the C=N stretching frequency, which moves from 1633 $cm^{-1}$ to 1625 $cm^{-1}$. This shift indicates that imine groups are the primary sites for $Pb^{2+}$ binding, highlighting a strong interaction at these locations. Additionally, the shifts in the triazine units' spectral bands from 1501 $cm^{-1}$ and 1363 $cm^{-1}$ to 1506 $cm^{-1}$ and 1367 $cm^{-1}$ further confirm their role in the adsorption process. These changes indicate that both imine and triazine functionalities play integral roles in the binding mechanism, potentially through coordination or complexation with the lead ions. FIG. 6B shows XPS spectra of PT-COF after adsorption of $Pb^{2+}$ and module compound $Pb(NO_3)_2$. The appearance of $Pb^{2+}$ XPS signals at 144.29 and 139.46 eV, corresponding to Pb $4f_{5/2}$ and Pb $4f_{7/2}$ respectively, confirms the inclusion of $Pb^{2+}$ within the PT-COF network. Notably, these values show a significant shift of about 0.7 eV to lower binding energies compared to the module compound $Pb(NO_3)_2$, which has binding energies of 143.72 eV for Pb $4f_{5/2}$ and 138.85 eV for Pb $4f_{7/2}$. This shift underscores strong interactions between PT-COF and $Pb^{2+}$, suggesting changes in the electronic environment around the lead ions, indicative of a strong binding affinity and possibly the formation of stable lead complexes within the framework. These analytical findings highlight the effectiveness of PT-COF in capturing $Pb^{2+}$ ions and sheds light on the complex interaction dynamics at the molecular level. The combination of FTIR and XPS analyses provides a detailed understanding of the adsorption mechanism, contributing to the optimization of PT-COF for enhanced heavy metal remediation in environmental applications.

Figure 7:
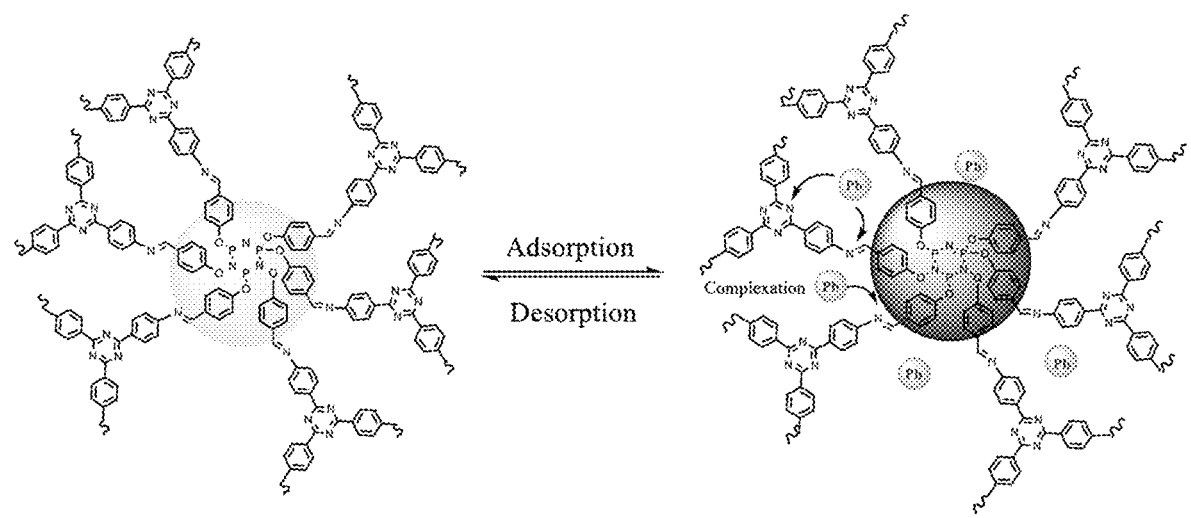
FIG. 7 shows adsorption and desorption processes of $Pb^{2+}$, in accordance with the present invention.

Furthermore, a visual change is observed in the colour of the PT-COF on adsorbing $Pb^{2+}$ ions. FIG. 7 illustrates the adsorption and desorption processes of $Pb^{2+}$ ions by PT-COF. Initially yellow, the PT-COF material turns dark brown upon adsorbing lead ions, visually confirming the adsorption. When treated with acid to release the adsorbed lead as described earlier, the colour of the COF reverts to its original yellow, illustrating not only the chemical interaction but also providing a simple, visual indicator of the adsorption and release processes. This colour change serves as a functional feature for monitoring the adsorption status and efficacy of PT-COF in real-time applications.

Figure 8:
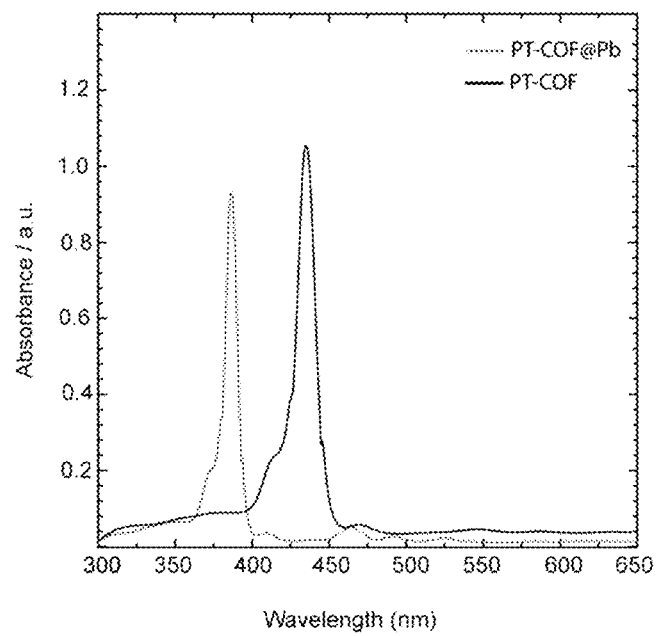
FIG. 8 shows UV-V is spectral analysis before and after lead adsorption, in accordance with the present invention.

In an embodiment of the present invention, UV-Vis spectroscopy is performed on PT-COF for lead adsorption and the results are analysed. FIG. 8 illustrates UV-Vis spectral analysis before and after lead adsorption. Initially, the COF in a neutral solvent exhibits a characteristic adsorbance peak at 427 nm. Upon exposure to a lead solution and allowing sufficient interaction time, this peak shifts to 376 nm, which is accompanied by a visible colour change in the COF from yellow to dark brown. This observed shift in the UV-Vis spectrum and the corresponding colour change is a key feature of PT-COF indicating status of lead adsorption process. The blue shift in the spectrum and the colour transition to dark brown signify a direct interaction between the lead ions and the COF's functional groups, resulting in complex formation. This interaction suggests changes in the electronic structure of the COF, indicating a more rigid COF-lead complex which alters the energy levels and the electronic transitions of the material. The COF has dual functionality: it effectively adsorbs lead ions, and it also provides a clear, visible indicator of this adsorption process. The colour change from yellow to dark brown enhances the COF's utility for real-time monitoring of pollution levels, making it particularly advantageous for environmental remediation applications.

Figure 9:
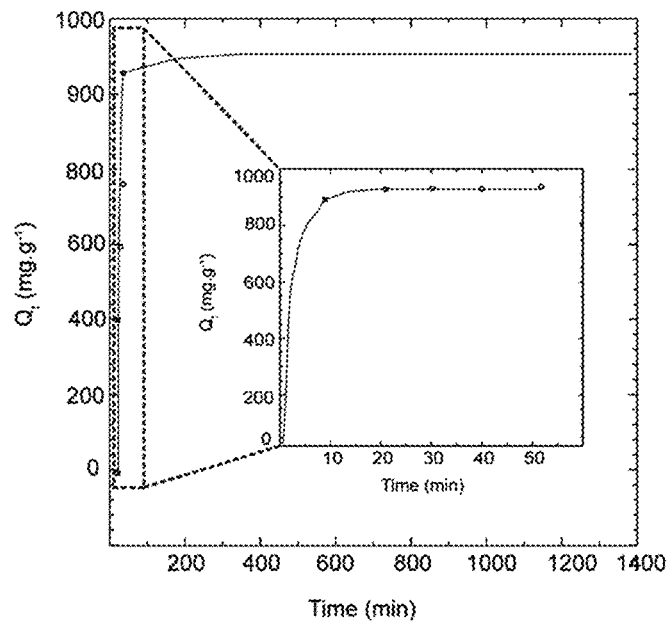
FIG. 9 shows adsorption kinetic curves of $Pb^{2+}$ adsorption on PT-COF, in accordance with the present invention.
Figure 10A:
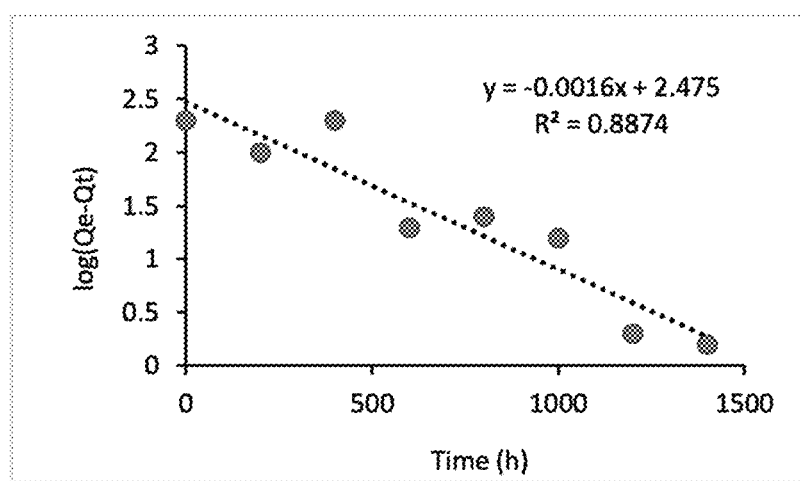
FIG. 10A shows the pseudo-first-order kinetic model, in accordance with the present invention.
Figure 10B:
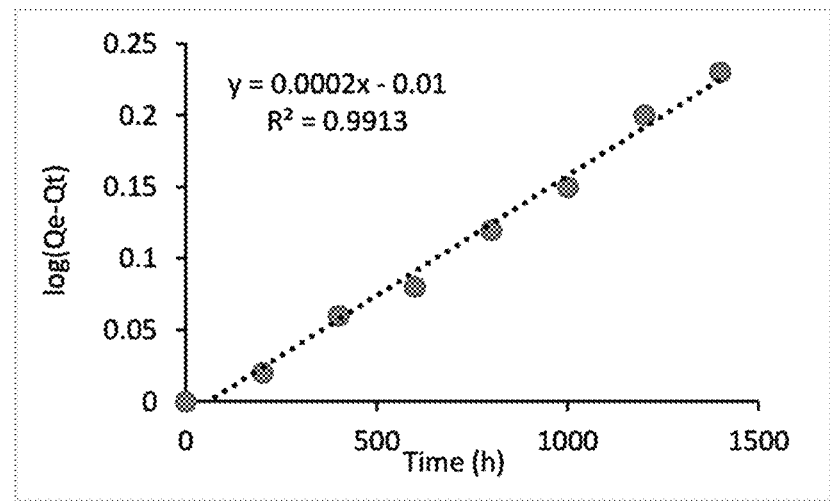
FIG. 10B shows the pseudo-second-order kinetic model, in accordance with the present invention.

The study of adsorption kinetics provides critical insights into the efficiency and speed at which PT-COF can capture lead ions from solutions, underlining its practical applications in environmental remediation. In an embodiment of the present disclosure, the kinetic experiments are conducted at a controlled temperature of 298 K using a solution with a lead concentration of 800 mg/g. The time intervals for the kinetic study ranges extensively from 2 minutes to 1440 minutes (24 hours), allowing a comprehensive analysis of the adsorption process over time. Adsorption kinetic curves of $Pb^{2+}$ adsorption on PT-COF is shown in FIG. 9. Initial findings reveal that PT-COF exhibits exceptionally rapid adsorption kinetics. A significant 90% of its adsorption capacity is reached within just 10 minutes, and the system reaches equilibrium in merely 20 minutes. This rapid attainment of equilibrium suggests that PT-COF can quickly reduce high concentrations of lead in contaminated water, making it highly effective for urgent pollution control scenarios. To further analyze the kinetics of lead adsorption on PT-COF, two common kinetic models are applied: the pseudo-first-order and pseudo-second-order kinetic models as represented by FIG. 10A and FIG. 10B respectively. Table 1 provides pseudo-first-order kinetic model and pseudo-second-order model parameters. The pseudo-first-order model assumes that the rate of occupation of adsorption sites is proportional to the number of unoccupied sites. However, this model provides a lower correlation coefficient ($R^2$=0.8874) for the experimental data, indicating a less accurate fit. In contrast, the pseudo-second-order kinetic model, which assumes that the rate-limiting step may involve chemisorption involving valence forces through sharing or exchange of electrons between adsorbent and adsorbate, shows a superior fit for the experimental data with a correlation coefficient ($R^2$=0.9913). Thus, analysis of the adsorption kinetics demonstrates a higher correlation factor ($R^2$=0.9913) for the pseudo-second-order kinetic model (FIG. 10B) compared to the pseudo-first-order model ($R^2$=0.0.8874) (FIG. 10A). This indicates that $Pb^{2+}$ adsorption on PT-COF absorbent is better described by the pseudo-second-order kinetic model.

TABLE 1

Pseudo-second-order kinetic model and pseudo-first-order model parameters

| | Pseudo-first order | | | | Pseudo-second order | | |
|---|---|---|---|---|---|---|---|
| $C_0$ (mg/L) | $Q_e$ (mg/g) | $K_1$ ($min^{-1}$) | $R^2$ | | $Q_e$ (mg/g) | $K_2$ ($min^{-1}$) | $R^2$ |
| 800 | 130.21 | 0.00430 | 0.8874 | | 926.33 | 0.000171 | 0.9913 |

This pseudo-second-order kinetic model's high correlation suggests that the adsorption process is chemisorptive and involves the chemical bonding of $Pb^{2+}$ ions onto the active sites of PT-COF. These kinetics insights demonstrate not only the efficiency of PT-COF in rapidly removing lead from aqueous solutions but also provide a theoretical basis for understanding the mechanism of adsorption. This knowledge is essential for optimizing the use of PT-COF in practical applications, ensuring effective and rapid purification of polluted water environments. The ability of PT-COF to achieve quick equilibrium and the model fit to pseudo-second-order kinetics are promising indicators for its potential scalability and application in large-scale environmental cleanup operations.

Figure 11:
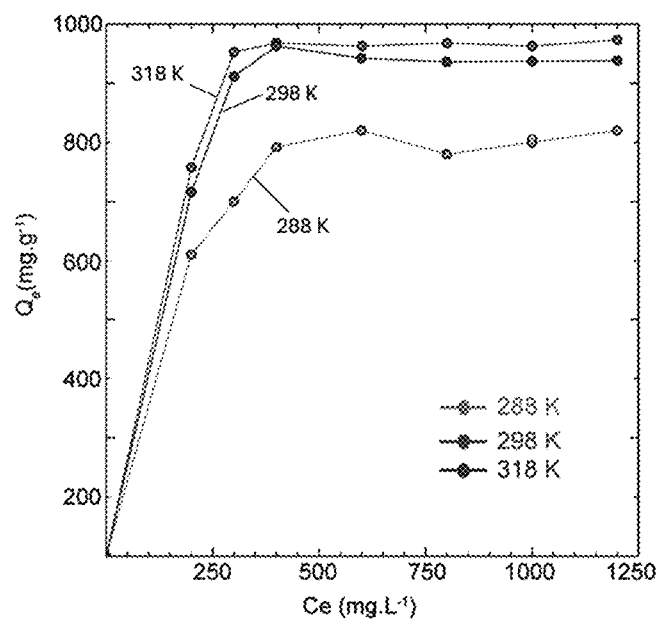
FIG. 11 shows the adsorption isotherms of $Pb^{2+}$ on PT-COF, in accordance with the present invention.

Adsorption isotherms of $Pb^{2+}$ on PT-COF are visually represented in FIG. 11. The adsorption isotherms, which plot the amount of $Pb^{2+}$ adsorbed per gram of PT-COF against the equilibrium concentration of $Pb^{2+}$ in the solution, provide critical information about the capacity and efficiency of PT-COF under various conditions. The experiments are conducted across different temperatures, in an embodiment of the invention, to determine the influence of thermal dynamics on adsorption efficacy. The isotherms at all tested temperatures, show a common pattern: a linear increase in $Pb^{2+}$ uptake initially, followed by a plateau phase where no further adsorption occurs despite increases in equilibrium $Pb^{2+}$ concentration. This characteristic pattern suggests that PT-COF has a high number of available adsorption sites that are quickly occupied until saturation. The linear portion of the isotherm typically indicates surface adsorption under less competitive conditions, where the concentration of lead in the solution is low enough that it does not fully engage all the available adsorption sites. As the concentration increases, these sites become saturated, leading to the plateau in the isotherm, reflecting a state where no additional lead can be adsorbed regardless of any further increase in lead concentration in the solution. At 298 K, PT-COF demonstrates an exceptional maximum adsorption capacity of 940 mg/g. This capacity not only showcases the high potential of PT-COF as a robust adsorbent but also signifies its superiority over most known adsorbents currently in use. Such a high adsorption capacity makes PT-COF an attractive option for the remediation of heavy metal-contaminated waters, particularly in scenarios where high efficiency and quick response are critical. Furthermore, the high performance of PT-COF at room temperature (298 K) is particularly advantageous for practical applications since it implies low energy requirements for maintaining optimal operating conditions. This energy efficiency, combined with the material's high adsorption capacity, underscores the potential of PT-COF to be developed into a cost-effective solution for large-scale water treatment operations. The findings, depicted in FIG. 11, reinforce the suitability of PT-COF for environmental applications where high capacity and efficiency are required for effective lead removal from contaminated water sources. These properties of PT-COF, especially noted at common ambient temperatures, position it as a viable candidate for integration into existing and future water treatment infrastructures.

Langmuir and Freundlich isotherm models are used to analyze the adsorption data of PT-COF on $Pb^{2+}$, with the regression parameters detailed in Table 2. The Langmuir isotherm, represented by Equation (5), and the Freundlich isotherm, represented by Equation (6), provide the parameters essential for understanding the adsorption process.

$$Q_e = \frac{K_L \times Q_m \times C_e}{1 \times K_L \times C_e} \quad (5)$$

$$Q_e = K_F \times C_e^{1/n_F} \quad (6)$$

TABLE 2

Freundlich isotherms and Langmuir isotherms parameters of $Pb^{2+}$ adsorption on PT-COF

| | Freundlich isotherm | | | Langmuir isotherm | | |
|---|---|---|---|---|---|---|
| T (K) | $K_F$ (L/g) | $n_F$ | $R^2$ | $K_L$ (L/mg) | $Q_m$ (mg/g) | $R^2$ |
| 288 | 44.0744 | 2.1845 | 0.7462 | 0.0143 | 853.576 | 0.9901 |
| 298 | 50.7924 | 2.2378 | 0.8008 | 0.0162 | 950.346 | 0.9933 |
| 318 | 69.4099 | 2.4915 | 0.8632 | 0.0267 | 994.858 | 0.9763 |

A comparison of these isotherm models reveal that the Langmuir model exhibits a significantly higher correlation coefficient than the Freundlich model, as given in Table 2, suggesting that the Langmuir model more accurately describes the isothermal adsorption of lead on PT-COF. This is further evidenced by the fact that the maximum adsorption capacity (Qm) predicted by the Langmuir model (950 mg/g at 298 K) closely matches the experimentally measured maximum adsorption amount of 940 mg/g. Additionally, the increase in Qm with rising temperatures indicates that higher temperatures facilitate enhanced adsorption. Moreover, the Freundlich isotherm model indicates strong interactions between PT-COF and $Pb^{2+}$, as suggested by adsorption constant ($n_F$) values exceeding 1, further supporting the efficiency of PT-COF in lead adsorption under varying conditions.

Figure 12:
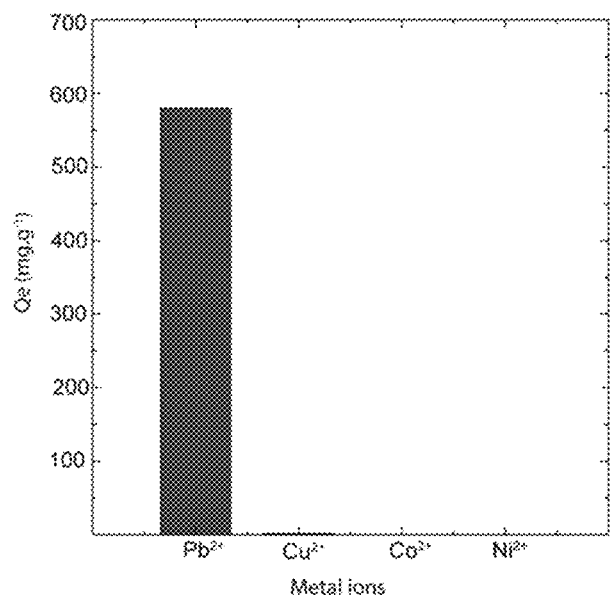
FIG. 12 shows selective adsorption of $Pb^{2+}$ by PT-COF in the presence of $Cu^{2+}$, $Co^{2+}$, and $Ni^{2+}$, in accordance with the present invention.

According to the disclosure, selective adsorption performance is analysed, and FIG. 12 shows the selective adsorption of $Pb^{2+}$ by PT-COF in the presence of $Cu^{2+}$, $Co^{2+}$, and $Ni^{2+}$. The dosage of adsorbents, concentration, and contact time are 10 mg, 600 mg g$^{-1}$, and 20 h, respectively. It is revealed that the Phosphazene-based Covalent Organic Framework (COF) exhibits remarkable selectivity in the adsorption of $Pb^{2+}$ ions, showcasing its effectiveness even in the presence of other competitive metal ions such as $Cu^{2+}$, $Co^{2+}$, and $Ni^{2+}$. This specificity is crucial for applications in areas with complex metal contamination and for targeted remediation. Despite the potential interference from these similar divalent cations, the Phosphazene COF's structure and binding sites are tailored to preferentially bind $Pb^{2+}$, ensuring that its adsorption capacity is not significantly impacted by the coexistence of other ions. This selective adsorption is particularly valuable for the targeted removal of lead from polluted water sources, contributing to safer and more effective remediation practices. FIG. 12 illustrating the performance comparison of the Phosphazene COF against these competing ions, clearly demonstrates its superior ability to selectively isolate and remove $Pb^{2+}$ from aqueous solutions. Such selective behaviour stems from the unique electronic and spatial configuration of the COF, which aligns well with the ionic radius of $Pb^{2+}$ compared to other metals present. This attribute makes Phosphazene COF an excellent candidate for purification systems designed to address specific pollution issues, ensuring more efficient and targeted contaminant removal.

Figure 13A:
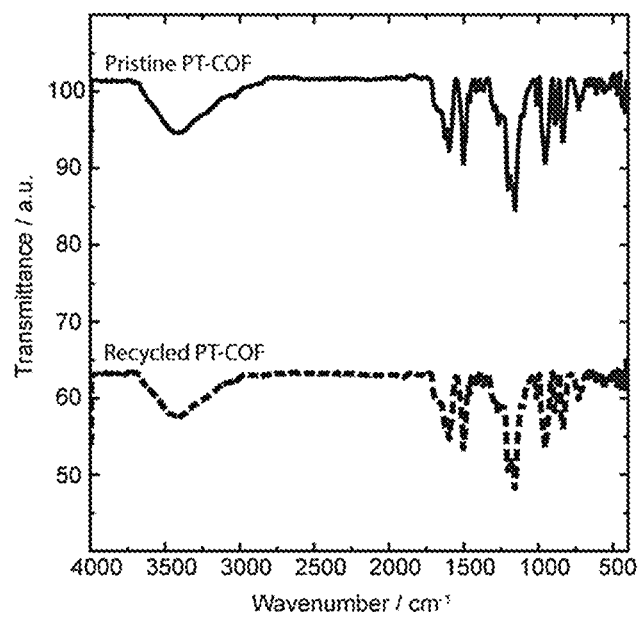
FIG. 13A shows FT-IR analysis of pristine and recycled PT-COF, in accordance with the present invention.
Figure 13B:
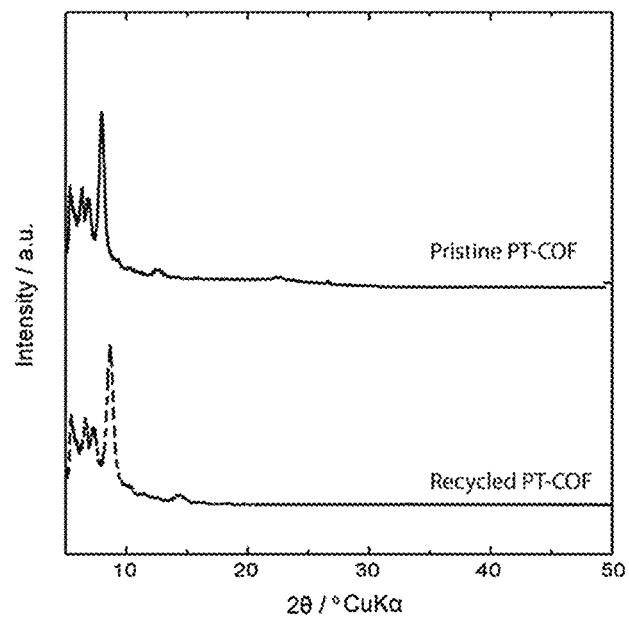
FIG. 13B shows PXRD analysis of pristine and recycled PT-COF, in accordance with the present invention.
Figure 13C:
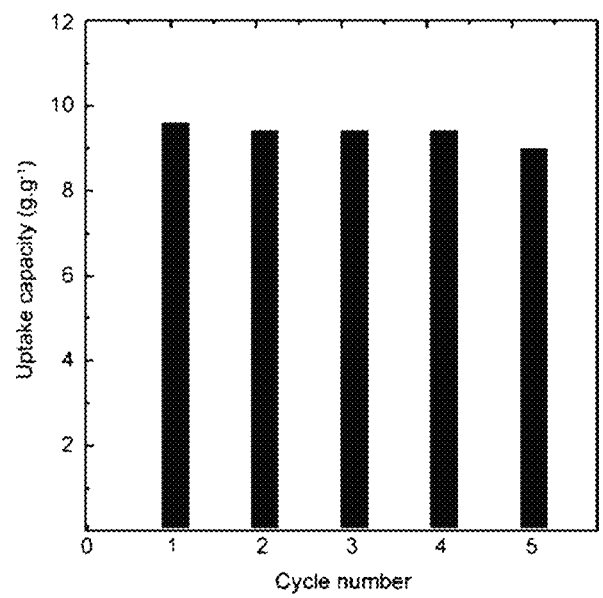
FIG. 13C shows cycle number vs. uptake capacity plot of PT-COF, in accordance with the present invention.

In an embodiment of the present invention, the recycling performance of the PT-COF is analysed for which 10 mg of PT-COF is introduced into 10 mL of a $Pb^{2+}$ solution (250 mol $L^{-1}$). After a 24-hour period, 2 mL of 0.1 mol $L^{-1}$ HCl is employed for elution. FIG. 13A, read along with FIG. 13B and FIG. 13C, indicate the reusability of PT-COF for the adsorption of $Pb^{2+}$. FIG. 13A depicts the FT-IR analysis and FIG. 13B indicates the PXRD analysis of pristine as well as recycled PT-COF. FIG. 13C represents cycle number vs. uptake capacity plot of PT-COF used in the process. The material maintains an adsorption rate of over 85% for $Pb^{2+}$ across five cycles, showcasing outstanding reusability. This sustained performance highlights the material's potential for repeated use in practical applications, contributing to its effectiveness in environmental remediation efforts.

The invention described herein, presents a nitrogen-phosphazene-based covalent organic framework (PT-COF) synthesized via a solvothermal method, from hexa(4-formyl-phenoxy) cyclotriphosphazene aldehyde and 1,3,5-tris-(4-aminophenyl) triazine, which demonstrates exceptional efficacy in removing $Pb^{2+}$ ions from water. The PT-COF described in this invention not only offers an unprecedented adsorption capacity of 940 mg/g and achieving equilibrium within 20 minutes but also displays enhanced selectivity for $Pb^{2+}$ over other heavy metals, which exceeds that of currently available materials. This is combined with superior recycling stability, making the framework a sustainable option for long-term applications in environmental cleanup. The distinctive feature of PT-COF, changing colour from yellow to dark brown upon lead adsorption, provides a visual indication of the process, adding functionality that aids in monitoring and managing the adsorption process effectively.

The proposed phosphazene-based covalent organic framework (PT-COF) in accordance with the present invention, represents a significant improvement over existing technologies by solving the critical issues of efficiency, selectivity, and operational viability in lead remediation. Benefits of this invention include high efficiency with an impressive adsorption capacity of 940 mg/g for $Pb^{2+}$ ions, which outperforms many current technologies. Moreover, the rapid adsorption kinetics of PT-COF, reaching equilibrium within a mere 20 minutes, expedites the remediation processes and swift purification of contaminated environments. It exhibits high selectivity towards $Pb^{2+}$ ions over other heavy metals, minimizing undesirable cross-reactions and ensuring precise, targeted removal of lead. The visual cue provided by PT-COF's color change from yellow to dark brown upon lead ion adsorption offers an easy and intuitive means of monitoring the purification process, enhancing control and efficacy. PT-COF's robust recycling capabilities ensure its long-term usability and sustainability, contributing to both cost-effectiveness and environmental preservation.

The present invention can be scaled up for practical applications, thereby ensuring its readiness to meet industrial demands. Implementing pilot scale studies and adopting a strategy of gradual scaling represents a proactive approach to address scalability of PT-COF. Furthermore, its post-use management involving development of standard operating procedures for the safe disposal or recycling of used PT-COF signifies a commitment to mitigating any potential environmental or health risks associated with it. By focusing on these positive aspects, PT-COF demonstrates its potential for responsible and sustainable utilization, bolstering its contribution to environmental stewardship and public well-being.

PT-COF holds substantial potential across various markets, including environmental remediation companies, government and municipal water treatment facilities, the mining and industrial sectors, research institutions, and manufacturers of water treatment products. The global environmental remediation market's projected growth to $163.4 billion by 2027 and the North American water treatment equipment market's value of approximately $13 billion in 2020 underscore the vast opportunities for PT-COF's adoption. The product appeal lies in its high efficiency in removing $Pb^{2+}$ ions, its precise selectivity towards lead ions, and potential integration into existing water treatment systems and heavy metal remediation infrastructure. Furthermore, PT-COF holds industrial relevance as it addresses the pressing need for enhanced water purification solutions and suitable for industries adhering to environmental regulations and standards. As such, PT-COF emerges as a versatile and valuable asset with significant potential to revolutionize water treatment practices and advance sustainability efforts globally.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims, which follow.

The invention claimed is:

1. A nitrogen-phosphazene-based covalent organic framework (PT-COF) for selective removal of lead ($Pb^{2+}$) ions from an aqueous solution, characterized by solvothermal synthesis using hexa (4-formyl-phenoxy) cyclotriphosphazene aldehyde and 1,3,5-tris-(4-aminophenyl) triazine, and possessing a visual feedback mechanism indicating the adsorption of the lead ions, wherein the PT-COF is mesoporous with Brunauer-Emmett-Teller (BET) surface area of 1120 $m^2$/g and a total pore volume of 1.53 $cm^3$/g.

2. The PT-COF of claim 1, wherein the visual feedback mechanism comprises the PT-COF changing colour from yellow to dark brown upon adsorbing the lead ions, thereby visually confirming the adsorption and the PT-COF reverting to its original yellow colour when treated with an acid, indicating release of the adsorbed lead ions, and the visual feedback mechanism thereby enables monitoring of adsorption status.

3. The PT-COF of claim 1, wherein it exhibits recycling stability and reusability after multiple cycles of adsorption and desorption.

4. The PT-COF of claim 1, wherein the PT-COF demonstrates selectivity for $Pb^2$+ ions over other heavy metals such as $Cu^{2+}$, $Co^{2+}$, or $Ni^{2+}$.

5. The PT-COF of claim 4, wherein the PT-COF offers an adsorption capacity of 940 mg/g and reaches adsorption equilibrium in 20 minutes.

6. The PT-COF of claim 4, wherein the adsorption of the lead ($Pb^{2+}$) ions on the PT-COF is chemisorptive and follows pseudo-second-order kinetic model.

7. The PT-COF of claim 4, wherein isotherms of the adsorption of the lead ($Pb^{2+}$) ions on the PT-COF fit into Langmuir model.

* * * * *